(12) United States Patent
Brannan et al.

(10) Patent No.: US 6,512,452 B1
(45) Date of Patent: Jan. 28, 2003

(54) REDUNDANT ELECTRIC TRAILER BRAKE CIRCUIT

(75) Inventors: Jack D. Brannan, Columbia, MO (US); Robert J. Wolf, Chariton, IA (US)

(73) Assignee: Astoria Industries of Iowa Inc., Chariton, IA (US)

( * ) Notice: Subject to any disclaimer, the term of this patent is extended or adjusted under 35 U.S.C. 154(b) by 0 days.

(21) Appl. No.: 09/573,934

(22) Filed: May 18, 2000

(51) Int. Cl.[7] .............................................. C08B 21/00
(52) U.S. Cl. ...................... 340/431; 340/467; 340/479; 340/654; 188/112 R; 307/24.1
(58) Field of Search ................................ 340/431, 467, 340/479, 669, 654; 188/112 R, 1.11; 303/24.1, 7

(56) References Cited

U.S. PATENT DOCUMENTS

| | | | |
|---|---|---|---|
| 3,913,064 A | 10/1975 | Salway et al. ............ 340/52 F |
| 3,975,708 A | 8/1976 | Lusk et al. .................... 340/80 |
| 4,024,497 A | 5/1977 | Ruppel et al. ................. 340/74 |
| 4,050,550 A * | 9/1977 | Grossner ................ 188/122 R |
| 4,127,854 A | 11/1978 | Gardner et al. ............. 340/640 |
| 4,325,052 A | 4/1982 | Koerner ....................... 340/67 |
| 4,857,807 A | 8/1989 | Hargis .......................... 315/77 |
| D331,223 S | 11/1992 | Hughes ...................... D13/147 |
| 5,433,296 A | 7/1995 | Webberley ................. 188/1.11 |
| 5,521,466 A * | 5/1996 | Vincent ...................... 340/431 |
| 5,775,712 A | 7/1998 | Link et al. .................. 280/422 |
| 6,206,481 B1 * | 5/2001 | Kaisers et al. ................. 303/7 |

\* cited by examiner

Primary Examiner—Daniel J. Wu

(57) ABSTRACT

A brake circuit that includes parallel electrical paths extending from the brake controller, through connectors, to the trailer brakes. The circuit having a primary circuit path extending from the power supply to a connector, through a diode to the brakes and back to the power supply and a secondary circuit extending from the power supply to a connector, through a diode to the brakes and a back to the power supply, and a pair of indicator lights connected to each circuit path between the connector and diode at one end and the power supply at the other end.

3 Claims, 2 Drawing Sheets

REDUNDANT ELECTRIC TRAILER BRAKE CIRCUIT

BACKGROUND OF THE INVENTION

1. Field of the Invention

This invention relates to tractor-trailer brake circuits, and more particularly to a redundant electrical brake circuit.

2. Background of the Invention

Brake systems for tractor-trailers and similar vehicles are well known in the art. Many of these systems are connected to indicator lights that inform a driver that circuit integrity is maintained. Brake systems can fail for a number of reasons including corrosion of connection pins, damage to connection pins, and broken wires. Safety problems arise when a brake system fails as accidents leading to serious injury can result. These accidents can lead to potential liability for personal injuries, as well as subsequent OSHA investigations and costly litigation.

A problem with present brake systems is that there is no means for maintaining the integrity of the system in the event of failure. When a system fails, a driver must stop, without the benefit of working brakes, and repair the system immediately, losing valuable time on the road.

Therefore, a primary object of the present invention is to provide a parallel electrical circuit path to maintain circuit integrity in the event of failure of one circuit.

A further object of the present invention is to provide a driver with notification that a circuit is in need of repair.

A further object of the present invention is to provide a brake circuit that improves safety.

A further object of the present invention is to provide a brake circuit that is easy to assemble and economical to manufacture.

These and other objects, features, and advantages of the present invention will become more apparent with reference to the accompanying specification and claims.

SUMMARY OF THE INVENTION

The present invention involves a tractor-trailer brake circuit that includes parallel electrical paths extending from a brake controller, through connectors, to the trailer brakes. In each of the parallel electrical paths, current is supplied to the circuit from a power supply when the brake is applied. Electricity flows from the power supply through the connector to the trailer brakes. Each electrical path also has a return path where electricity flows back through the connector to an indicator light that shows that integrity of the circuit is maintained. When the current flow is interrupted in either electrical path, the indicator light for that electrical path will not glow when the brakes are applied. The driver can then report the failure of one of the electrical paths at the end of a shift and fix the damage circuit during a down period, thus the integrity of the system is never compromised during operation.

DETAILED DESCRIPTION OF PREFERRED EMBODIMENTS

The preferred embodiment of the present invention will be described as it applies to a redundant electric brake circuit generally indicated by reference 10. It is not intended that the present invention be limited to the described embodiment. On the contrary, it is intended that the invention cover all alternatives, modifications and equivalencies that may be included within the spirit and scope of the invention.

Figure 1:
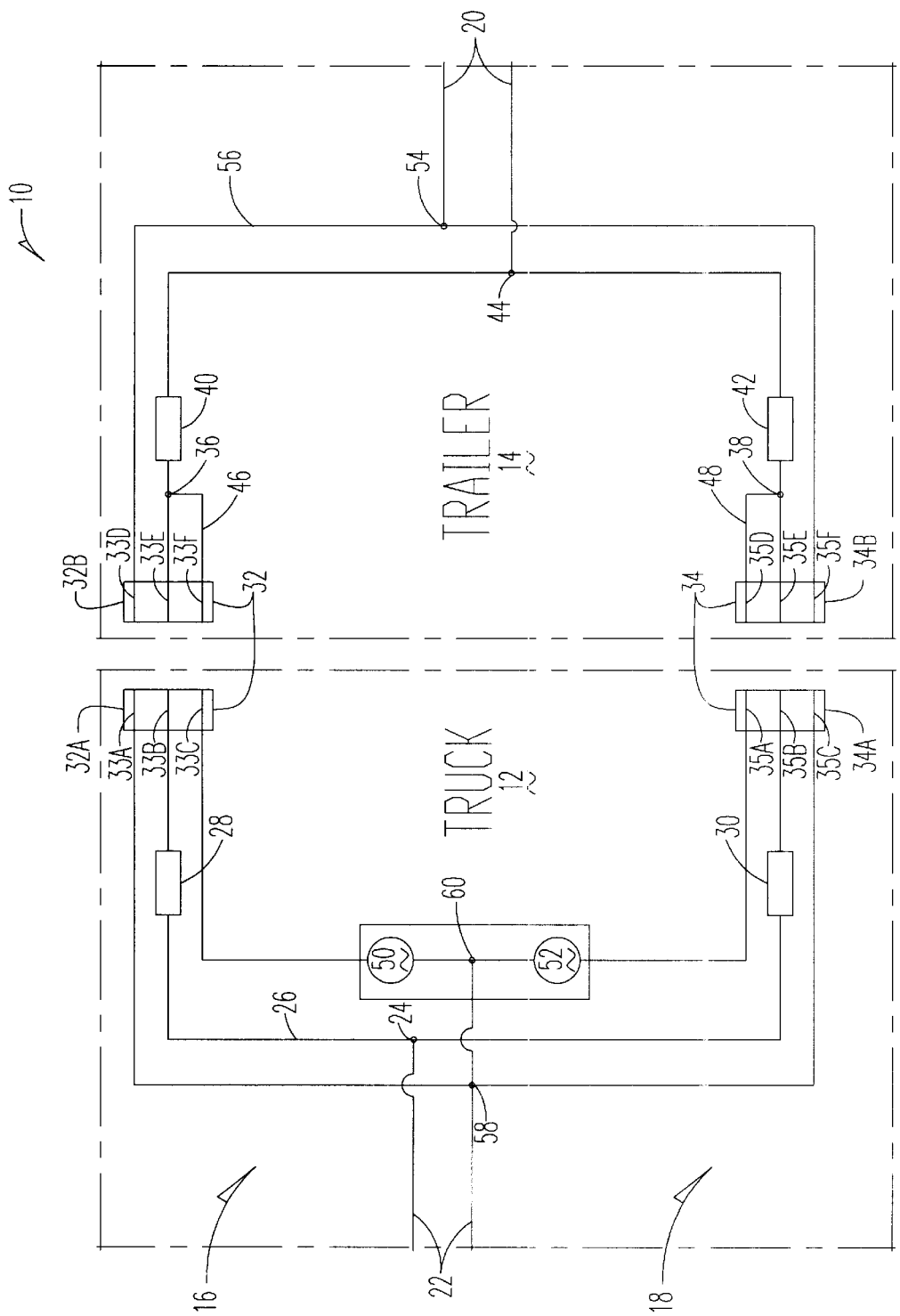
FIG. 1 is a schematic of the redundant electric brake circuit.

With reference to FIG. 1, the redundant electric brake circuit 10 extends from a truck 12 to a trailer 14. The circuit 10 has a primary circuit path 16 and a secondary circuit path 18.

Generally, circuit paths 16, 18 provide power connections from the truck 12 to the trailer 14 and the brakes 20 on the trailer 14. Both primary circuit path 16 and secondary circuit path 18 are connected to a power supply 22. Preferred is a power supply of 12 volts, but the invention is not limited with respect to the power supply used. The power supply 22 has a positive terminal that is electrically connected to both circuits 16, 18 at node 24. A current from the power supply flows through positive line 26 which connects to fuses 28, 30. Fuses 28, 30 prevent high current or a surge in current from damaging other components in circuit 10. In the preferred embodiment, the circuit utilizes 20 amp fuses. Line 26 extends through fuses 28, 30 to connectors 32, 34. While any type of conventional connector can be used, as shown in FIG. 1 two three-pin plug and socket connectors are used. The connectors 32, 34 have pin portions 32A, 34A, receptacle portions 32B, 34B, pins 33A, 33B, 33C, 35A, 35B, 35C and receptacles 33D, 33E, 33F, 35D, 35E, 35F. The pins 33A, 33B, 33C, 35A, 35B, 35C of pin portions 32A, 34A are received by receptacles 33D, 33E, 33F, 35D, 35E, 35F of the receptacle portions 32B, 34B. Preferred, however, is a single six-prong connector.

Line 26 extends through connectors 32, 34 to nodes 36, 38. While any pin and receptacle can be used, as an example only, in FIG. 1 line 26 extends through pins 33B, 35B and receptacles 33E, 35E to nodes 36, 38. From nodes 36, 38, line 26 extends through diodes 40, 42 to node 44. The brakes 20 are connected to node 44, which supplies current to the brakes 20 for operation. The brakes 20 are also electronically connected to node 54. The current flows from the brakes 20 through node 54 to a negative line 56. Line 56 extends back through connectors 32, 34 to node 58 which is electrically connected to the ground terminal of the power supply 22 and node 60 which is connected to indicator lights 50, 52. While any one of the pins and receptacles can be used, as an example only and as shown in FIG. 1, line 56 extends through receptacles 33D, 35D to pins 33A, 35A which are connected to node 58.

Also extending from nodes 36, 38 are return paths 46, 48. Return paths 46, 48 extend from nodes 36, 38 back through connectors 32, 34 to indicator lights 50, 52. While any one of the pins and receptacles may be used, as an example only and as shown in FIG. 1, return paths 46, 48 extend through pins 33F, 35F to receptacles 33C, 35C and then to indicator lights 50, 52 which are connected to node 60. When integrity of the circuit is maintained, positive current flows through return paths 46, 48 illuminating indicator lights 50, 52.

The diode 40 prevents the secondary circuit path 18 from affecting the primary circuit path 16 by restricting current flow in a reverse direction from node 24 to node 36. Likewise, diode 42 prevents the primary circuit path 16 from affecting the secondary circuit path 18 by restricting current flow in a reverse direction from node 24 to node 38.

In use the circuit 10 is activated when an operator applies pressure to the brake controller 62. When pressure is applied to the brake controller 62 the power supply 22 is activated sending current to circuit paths 16, 18 through node 24. The current flows on line 26 from node 24 through fuses 28, 30 to connectors 32, 34 to nodes 36, 38. From nodes 36, 38 current flows through diodes 40, 42 to node 44 which is electronically connected to the brakes 20 and the brakes 20 are activated. Current also flows from nodes 36, 38 on return paths 46, 48 back through connectors 32, 34 to indicator lights 50, 52 illuminating the indicator lights 50, 52.

When a connector malfunctions or is damaged, current is still provided to the brakes 20 for activation, but the corresponding indicator light will not be illuminated signaling the operator the malfunction and the need for repair. For example, if one connector 32 malfunctions due to corrosion or damage positive current will not flow on the path from the power supply 22 to node 36, which also means that no positive current will flow on return path 46 and indicator light 50 will not be illuminated. While the current will be interrupted on path 16 preventing illumination of indicator light 50, current will still flow on path 18, which has a functional connector 34, from the power supply 22 to the brakes 20 activating the brakes 20. Diode 40 will restrict the positive current on path 18 from flowing to return path 46 so that the positive current from path 18 will not illuminate indicator light 50. The positive current on path 18, however, while activating the brakes 20, will also flow down return path 48 and illuminate indicator light 52. If connector 34 were to malfunction, instead of connector 32, the opposite is true.

It is important in this example to note the importance of the diodes 40, 42. In the above example, if the diode 40 were not there then current supplied through the secondary circuit path 18 from node 24 would flow to node 36, not being blocked by diode 40. Current would then flow through receptacle 33F on return path 46 to positive pin 33B and to indicator light 50. This would result in an undesired circumstance as both indicator light 50 and indicator light 52 would be illuminated, when only the secondary circuit path 18 is operational. Inclusion of diodes 40, 42 eliminates this problem so that each circuit path 16 and 18 can be monitored independently.

Figure 2:
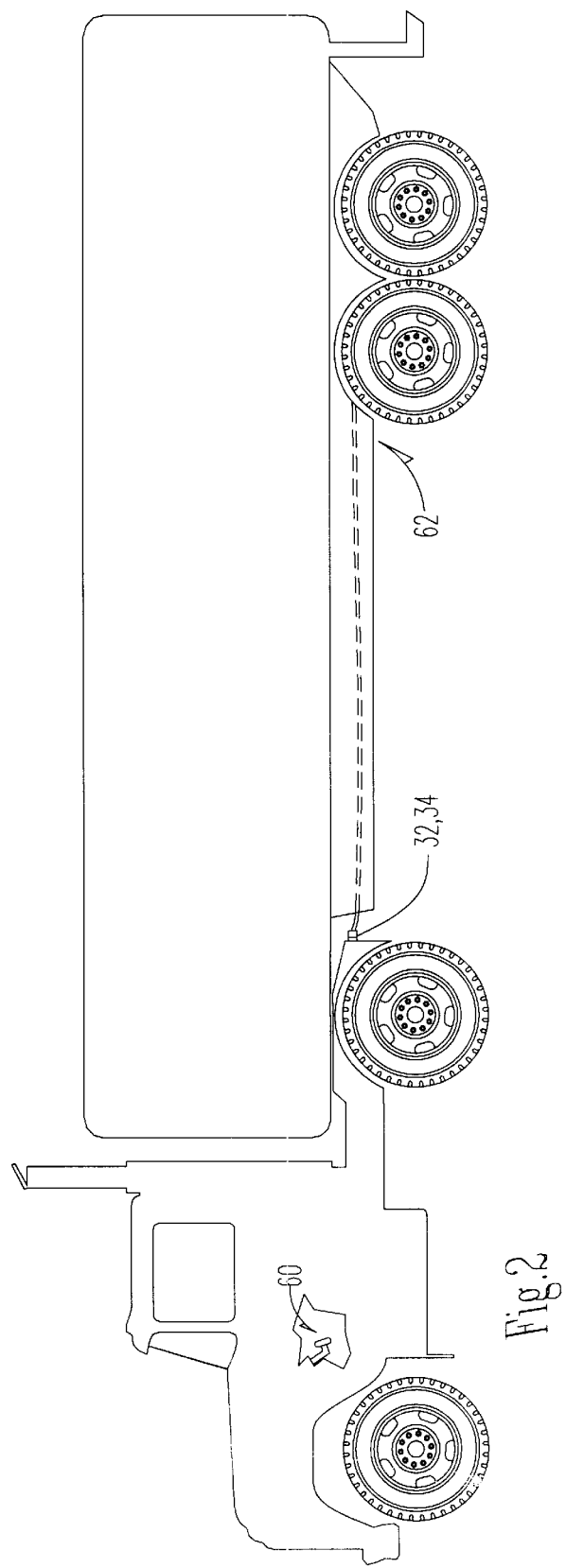
FIG. 2 is a drawing of the redundant electric brake circuit installed on a tractor-trailer.

With reference to FIG. 2, it can be shown how the redundant electrical brake circuit 10 extends from the brake controller 62, through the connectors 32, 34 to the point where the wires leave the trailer frame to extend to the trailer axle 64. The parallel paths 16, 18 can extend all the way to the axle 64 and can be secured there thus protecting the integrity of every flexible area of the system.

As can be seen from this description, the objects of this invention have been met. When a single connector malfunctions, current will still be provided to activate the brakes 20 through the alternative circuit path and the operator will be notified of the malfunction in the inoperative circuit path because the indicator light will not be illuminated. Therefore, circuit integrity to the brakes 20 will be maintained even in the event of a malfunction to one circuit path which can be repaired after an operator's shift is over. This will provide for greater safety in the operation of tractor-trailers or similar configurations.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

What is claimed:

1. An electrical brake circuit providing parallel circuit paths from a brake controller to brakes comprising:

a power source connected to a primary and a secondary circuit path;

the primary circuit path having a first connector connected to the power source, a first diode connected to the first connector at one end and connected to the brakes at the other end, and the brakes connected to the power supply;

the secondary circuit path having a second connector connected to the power source, a second diode connected to the second connector at one end and the brakes connected to the other end, and the brakes connected to the power supply;

a first indicator light connected to the primary circuit path between the first connector and the first diode at one end and the power supply at the other end; and a second indicator light connected to the secondary circuit path between the second connector and second diode at one end and the power supply at the other end.

2. The circuit of claim 1 wherein the primary circuit path has a first fuse connected between the power supply and the first connector.

3. The circuit of claim 1 wherein the secondary circuit path has a second fuse connected between the power supply and the second connector.

* * * * *